United States Patent [19]

Menders et al.

[11] Patent Number: 5,502,558
[45] Date of Patent: Mar. 26, 1996

[54] LASER DOPPLER VELOCIMETER

[76] Inventors: James H. Menders, 943 Oliver Ave., San Diego, Calif. 92109; Brett Spivey, 131 Seeman Dr., Encinitas, Calif. 92024

[21] Appl. No.: 316,939

[22] Filed: Oct. 3, 1994

[51] Int. Cl.⁶ .................................................. G01S 17/58
[52] U.S. Cl. ...................................... 356/28.5; 356/5.09
[58] Field of Search ............................... 356/28.5, 5.09; 342/193 US

[56] References Cited

U.S. PATENT DOCUMENTS

| 4,902,127 | 2/1990 | Byer et al. | 356/28.5 |
| 5,202,741 | 4/1993 | Snyder | 250/330 |
| 5,267,010 | 11/1995 | Kremer et al. | 356/5.01 |

OTHER PUBLICATIONS

Blue cesium Faraday and Voigt magneto–optic atomic line filters, Menders et al, Opter Letters vol. 17, No. 19/Oct. 1992.

*Primary Examiner*—Thomas H. Tarcza
*Assistant Examiner*—Pinchus Laufer
*Attorney, Agent, or Firm*—John R. Ross

[57] ABSTRACT

A laser Doppler velocimeter. A laser produces a single frequency beam which is split into a probe beam and a reference beam. The probe beam is directed at a moving target and a portion of the light reflected from the target is collected, formed into a beam. Both the reference beam and the reflected beam passed through an atomic line filter in which a vapor cell is subjected to a constant magnetic field and a second magnetic field which is being oscillated. Light of the reference beam and the reflected beam passing through the filter is detected and analyzed at the frequency of oscillation of the second magnetic field and at twice that frequency. The speed of the target can be determined from measurements with respect to each beam of the amplitudes at these two frequencies.

12 Claims, 8 Drawing Sheets

LASER DOPPLER VELOCIMETER

This invention relates to laser sensors for velocity measurement.

BACKGROUND OF THE INVENTION

It is known that the speed of an object can be determined by transmitting a laser pulse at the object and measuring the Doppler frequency shift of the light backscattered from it. The frequency shift as a function of the velocity V of the target is $$f_s = \frac{2V}{\lambda}$$

where $f_s$ is the Doppler frequency shift and $\lambda$ is the wavelength of the laser beam. Thus, for example, using a laser operating at 852 nm ($852 \times 10^{-7}$ cm) a target receding at a velocity of 100 cm/sec would shift the wavelength of the reflected light by 2.3 MHz. Four such laser devices are discussed by Menzies in "Doppler Lidar Atmospheric Wind sensors: A Comparative Performance Evaluation for Global Measurement Applications from Earth Orbit"; Applied Optics, Vol. 25, No. 15, Aug., 1, 1986. These proposed systems utilize either a heterodyne detection system or a Fabry-Perot filter to measure the Doppler shift.

In U.S. Pat. No. 5,267,010, Kremer and Korevaar disclose a device for measuring wind speed. The device utilizes a pulsed, frequency locked laser source and two Faraday atomic line filters to measure wind speeds to an accuracy of 1 meter per second. The filter transmission spectra feature sharp peaks with sides whose position in frequency can be adjusted by design. Doppler shifts in light reflected from aerosols and particles in the wind can be determined by tuning one of the two filters to provide increasing transmission with increasing frequency and tuning the other filter to provide decreasing transmission with increasing frequency. Portions of the outgoing beam and the reflected beam are passed through each of the two filters and the transmitted power measured for each filter. The wind speed can be calculated from the measurements.

SUMMARY OF THE INVENTION

The present invention provides a laser Doppler velocimeter. A laser produces a single frequency beam which is split into a probe beam and a reference beam. The probe beam is directed at a moving target and a portion of the light reflected from the target is collected and formed into a beam. Both the reference beam and the reflected beam passed through an atomic line filter in which a vapor cell is subjected to a constant magnetic field and a second magnetic field which is being oscillated. Light of the reference beam and the reflected beam passing through the filter is detected and analyzed at the frequency of oscillation of the second magnetic field and at twice that frequency. The speed of the target can be determined from measurements with respect to each beam of the amplitudes at these two frequencies. In our first demonstration set up we measured velocity with an accuracy of ±3 cm/sec.

DETAILED DESCRIPTION OF PREFERRED EMBODIMENTS

Preferred embodiments of the present invention can be described by reference to the drawings.

Experimental Setup

Figure 1:
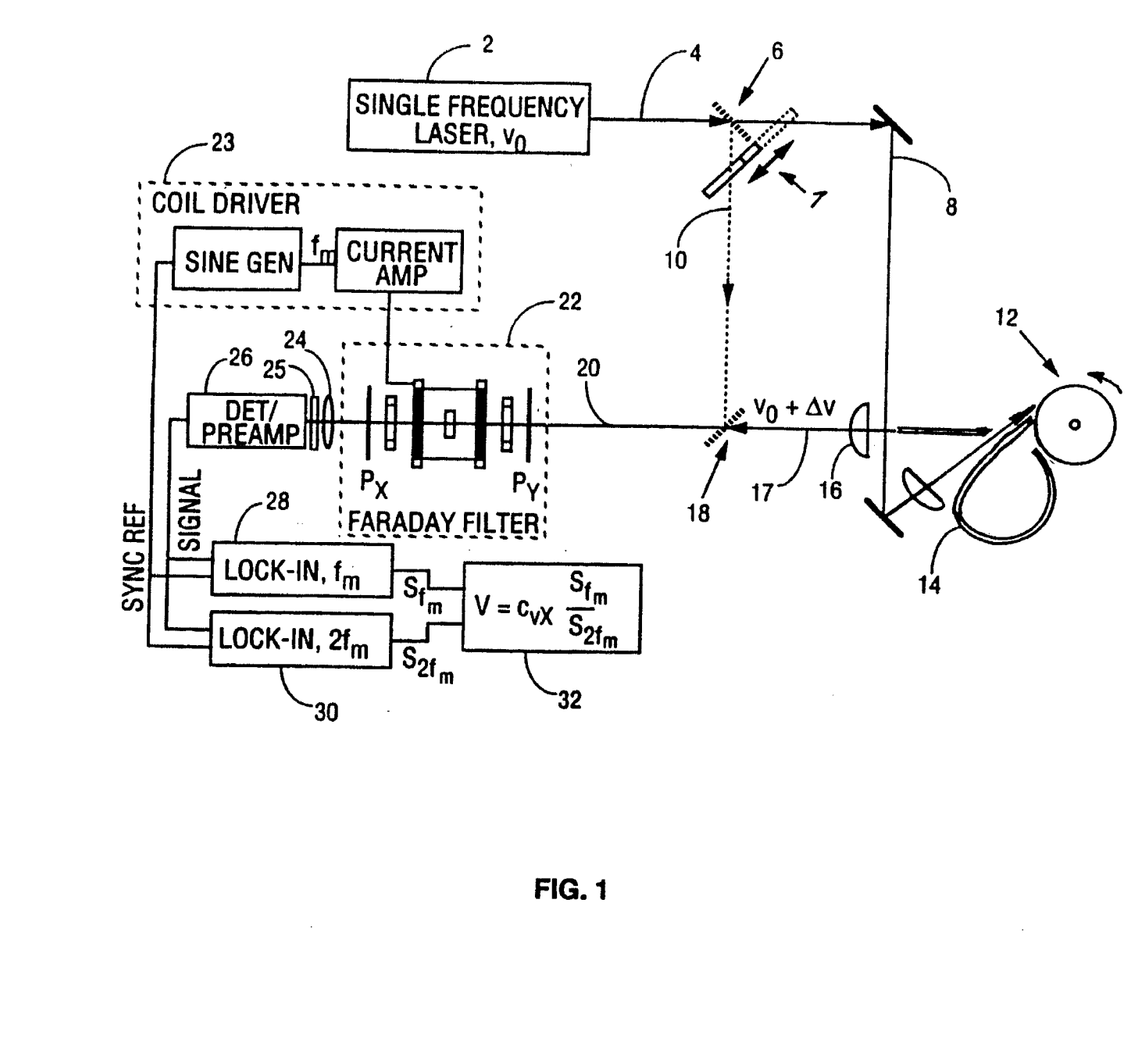
FIG. 1 is a drawing showing the elements of a proof of principle demonstration.

FIG. 1 shows a diagram of an experimental setup built by the inventors for proving the principles of the present invention.

A CW diode laser 2 produces a 20 mW 3 mm diameter circular laser beam 4 locked with a Voigt filter at a frequency equivalent to 852 nm. (The details of construction of our preferred frequency locking method are discussed below.) Beam 4 is split by beam splitter 6 at a ratio of about 92%-8%, respectively, into probe beam 8 and reference beam 10. The probe beam is directed by two mirrors to a moving target which in this demonstration was a variable speed rotating disk 12. The beam strikes the surface of the disk in a direction oriented nearly opposite to the motion of the target area. One end of a multimode optical fiber 14 with a 350 μm core is placed parallel to the section of beam 8 directed at spinning disk 12 for the purpose of collecting backscattered light. A portion of beam 8 is reflected off the surface of spinning disk 12 into optical fiber 14 which transmits the light to a 10× microscope objective 16 which produces a collimated reflected beam 17. The beam then passes through beam combiner 18 which reflects a portion of reference beam 10 along the path of reflected beam 17. The beams pass separately through stopband Faraday filter 22 as a consequence of the operation of shutter 7. As explained in detail below, filter 22 acts like a frequency dependent modulated attenuator oscillating at 10 kHz which we refer to as $f_m$. Collection lens 24 focuses the portion of reflected beam 17 and reference beam 10 passing through filter 22 through bandpass filter 25 (centered on 852 nm) onto the sensitive area of photodiode/preamplifier 26 (New Focus model 2001). This photodiode/preamplifier 26 is configured with a gain of 1 volt/μW and a frequency response between 3 kHz and 30 kHz. The output signal from photodiode/preamplifier 26 is connected in parallel to a pair of lock-in amplifiers (Stanford Research System 510 and 530, respectively) 28 and 30 to measure the spectral amplitudes at $f_m$=10 kHz and $2f_m$=20kHz. The reference inputs of the lock-ins were connected in parallel to a sinusoidal sync signal originated by the coil driver 23. Both lock-ins were set up with 100 μV sensitivity, and 30 ms time constants. A voltage representing the ratio $S_{fm}/S_{2fm}$, where $S_{fm}$ is the voltage amplitude of the first harmonic signal and $S_{2fm}$ is the voltage amplitude of the second harmonic signal, was conveniently output by using the ratioing feature of the SRS 510, which normalized the first harmonic signal by the voltage representing the second harmonic amplitude output by the SRS 530. We call this ratio $S_{fm}/S_{2fm}$ the quantity X.

Figure 7:
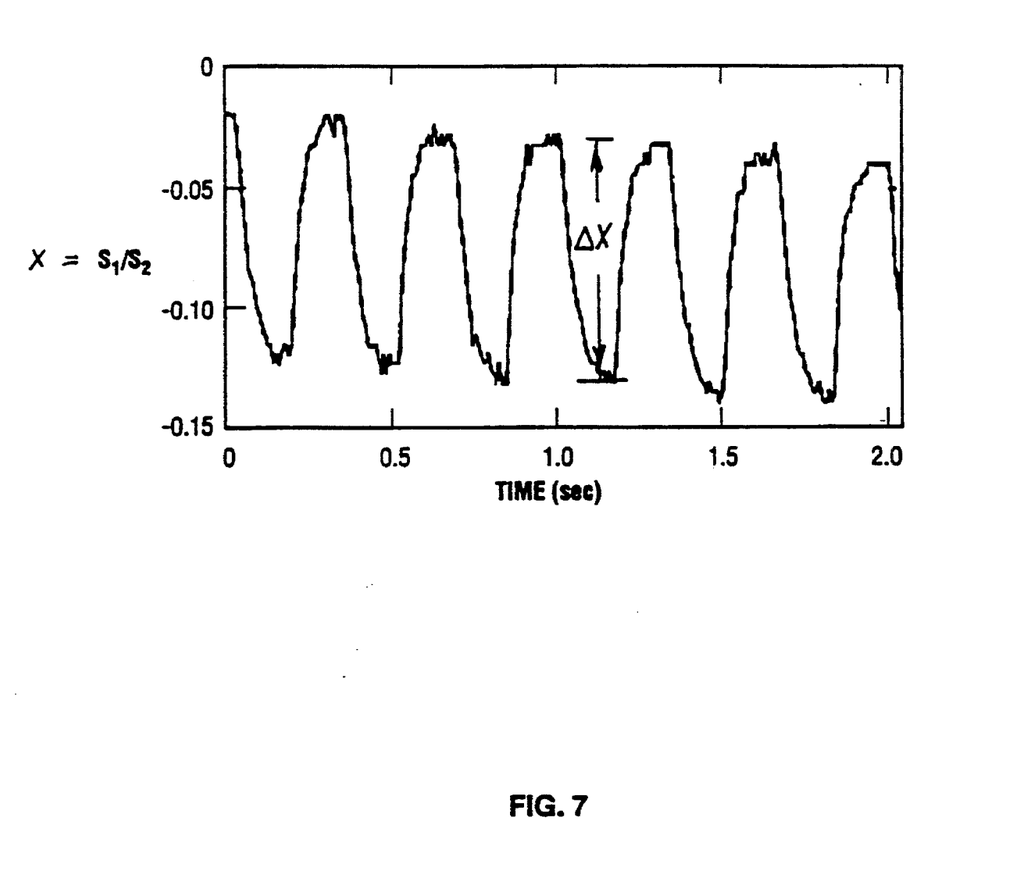
FIG. 7 shows data from our experimental setup.
Figure 8:
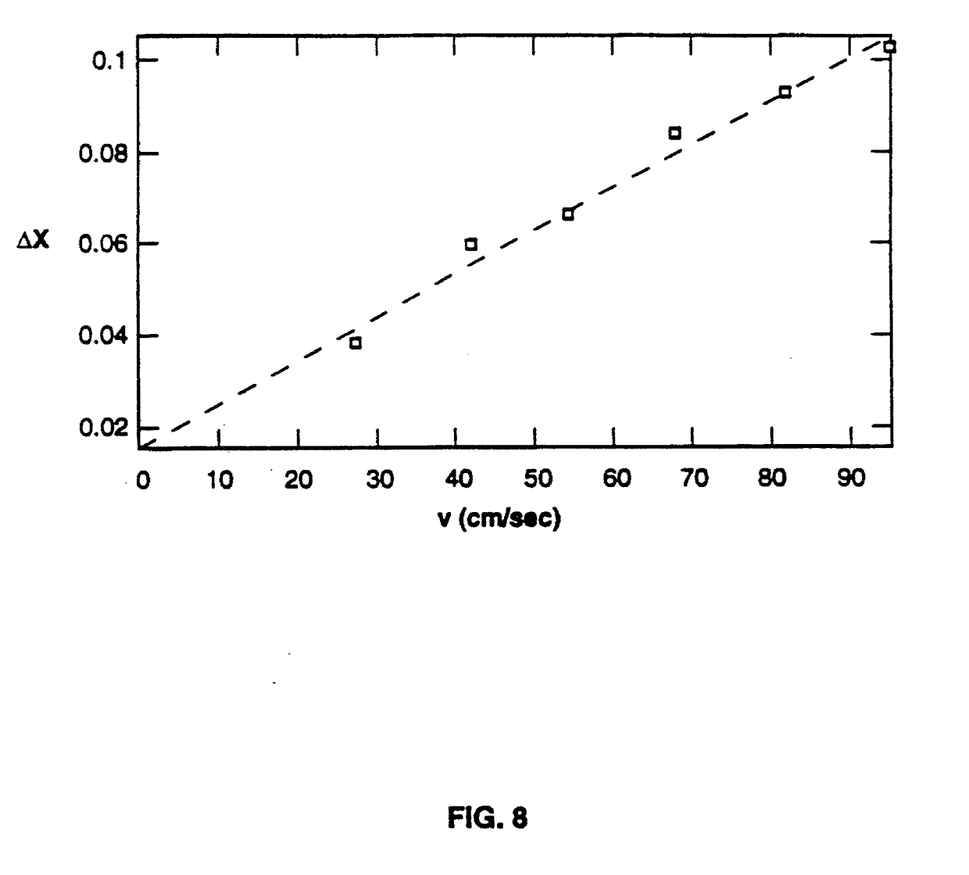
FIG. 8 shows a plot of our results.

To remove the effects of small frequency drifts in the laser or analyzer, we use the reference beam to measure the zero-velocity ratio, X0. This is incorporated into X as an offset adjustment to obtain DX=X–X0. DX is proportional to the velocity. We select between the probe and reference beam input to the Doppler analyzer using the shutter 7 shown in FIG. 1. FIG. 7 shows a record of the ratio X as the shutter 7 alternately selects between the reference beam 10 and the signal beam 17 comprised of scatter from a 1 m/sec velocity target. Upon selection of the probe beam, the signal initially rises and settles to its terminal value in about 5 lock-in time constants or 150 ms. Similarly, upon selection of the reference beam, the signal initially falls and settles to its terminal value. We measured DX as the difference between the terminal values of X for successive measurements of the signal and reference beams. A series of X measurements similar to FIG. 7 were made for target velocities ranging from 0–100 cm/sec. We determined DX from the average of the difference in several terminal readings of the probe and reference beams. A plot of ΔX vs. target speed, shown in FIG. 8, indicates the linearity of these measurements. The slope of the best fit line gives the calibration constant of 10.5 m/sec. The standard deviation of the data from the best fit line is less than 3 cm/sec.

Faraday Filter

Figure 3:
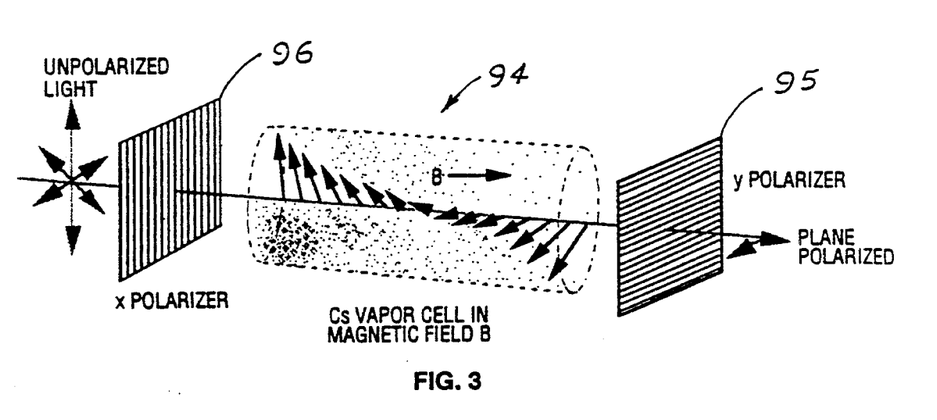
FIG. 3 explains how a Faraday filter works.

FIG. 3 is a simplified diagram depicting the operation of a Faraday filter. The Faraday filter consists of an atomic vapor in a cell 94 located between crossed polarizers 95 and 96. A magnetic field is applied to the cell which Zeeman splits the energy levels resulting in different absorption lines for left and right circularly polarized light. Near these lines the filter acts as a Faraday rotator providing rotary power only in the vicinity of an absorption lines, which provides the 90 degree rotation necessary to pass the second polarizer 96. At higher fields and vapor densities multiple rotations lead to rapid modulations in the transmission spectrum. Away from the absorption line the filter provides an out of band rejection that is determined by the extinction ratio of the crossed polarizers. By tuning the temperature and the magnetic field the Faraday filter curves can be shifted.

Stop-band Faraday Filter

Figure 4:
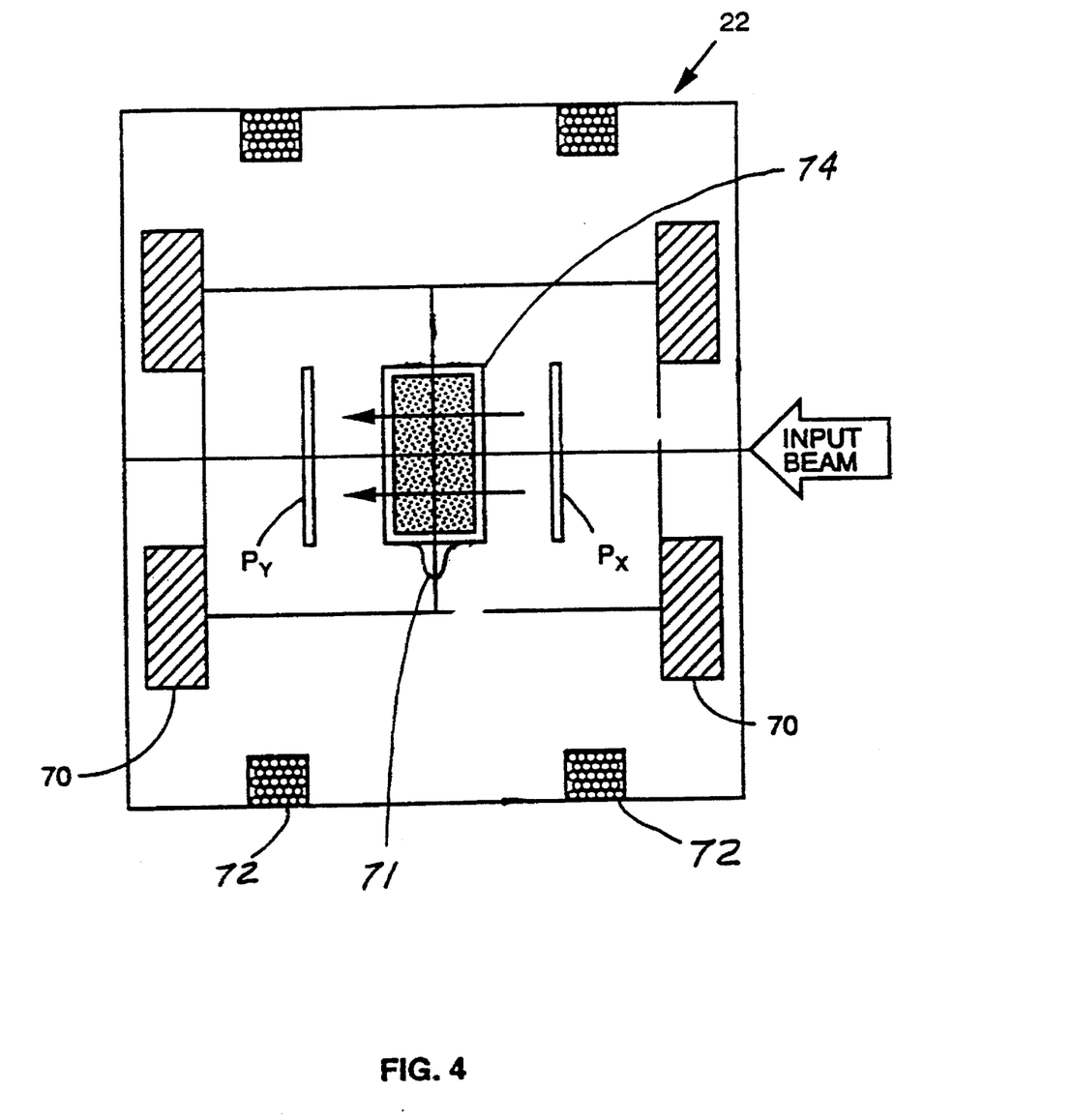
FIG. 4 shows the elements of our stop-band filter.
Figure 5:
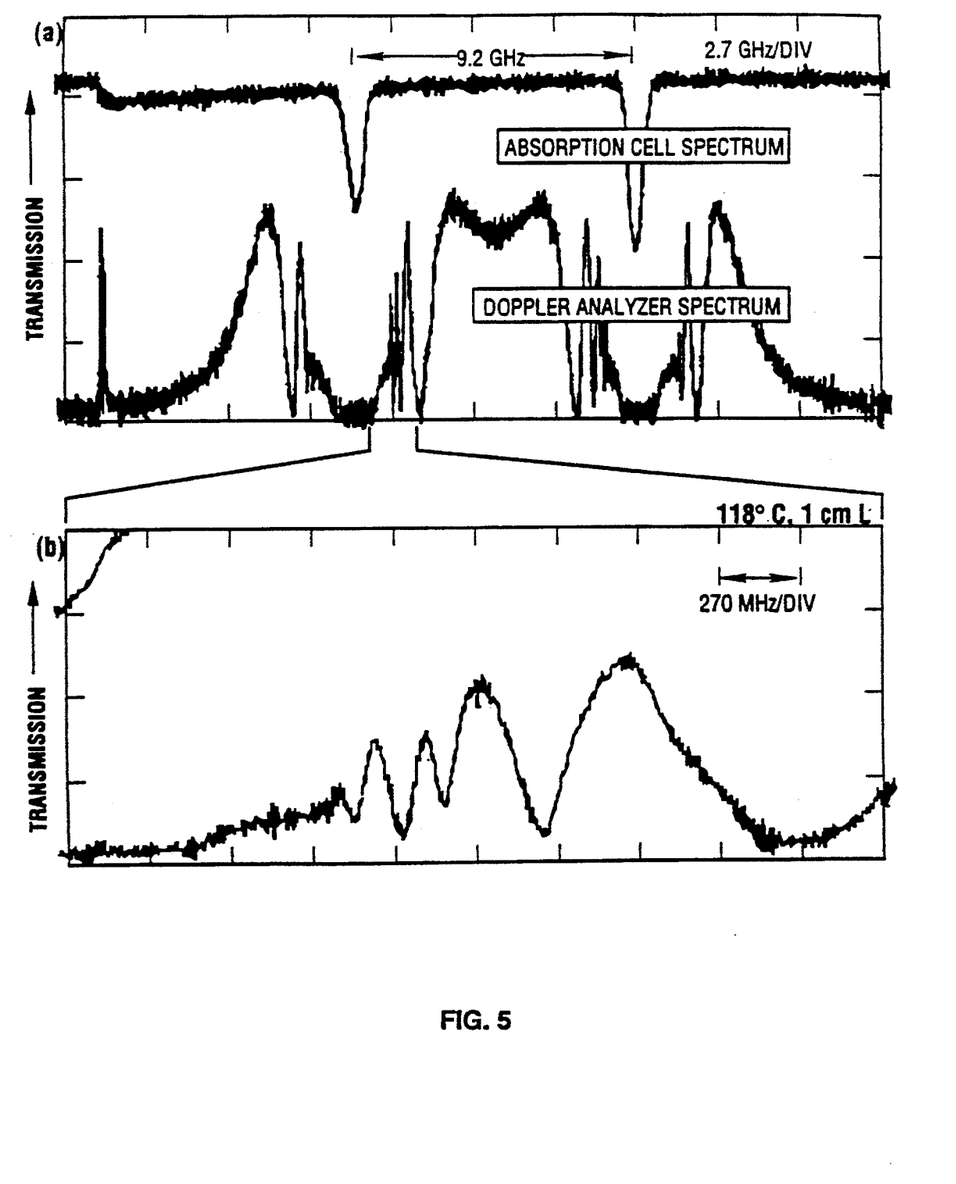
FIG. 5 shows the relationship between the spectrum of our laser locking filter and our stop-band filter.

Faraday filter 22 shown in FIG. 4 (and as a part of FIG. 1) is designed to provide dithered stopband. We will also refer to the dithered Faraday filter more generally as a Doppler analyzer. Our analyzer was designed to operate at a wavelength near the cesium D2 line at 852 nm. The transmission spectrum of the cell due to the bias magnets only is shown in the upper part of FIG. 5. The scale of the spectrum is given by the cesium absorption cell spectrum showing the two hyperfine absorption lines, which are split by 9.2 GHz. The bottom part of FIG. 5 shows an expansion of the spectral interval used by the analyzer. The analyzer utilizes the transmission valley indicated in FIG. 6 with the center frequency 53 at the minimum of the valley and with a width of approximately 100 MHz. This valley is dithered over a frequency interval approximately equal to its width with a modulation frequency of about 10 kHz.

A cross sectional drawing of our filter 22 is shown in FIG. 4. Light enters the horizontal polarizer, traverses the vapor cell and exits the vertical polarizer $P_y$. The body of the analyzer provides positioning among the analyzer components, especially the vapor cell 74 and the permanent magnets 70 and the electro-magnets 72. The body is constructed of delrin and hydlar, for thermal insulation of the vapor cell and noninterference with the fields. Metal components were avoided since high permeability or the susceptibility to eddy currents could disturb the magnetic field design.

The vapor cell 74 in this embodiment transmitted light along a path length of about 1 cm through the hot cesium vapor. The vapor cell consists of an evacuated pyrex cylinder with entrance and exit windows loaded with a small amount of cesium. The cell also features a hollow stub at its center which acts as a reservoir and a cold finger. The cell is heated by a wrapping of heat tape around its middle. The vapor density in the cell is set by the coolest temperature in the cell interior, which is made to occur at the cell stub 71. Heat is applied to the sides of the cell by the tape, while the stub is relatively under-insulated to maintain it a slightly cooler temperature than the rest of the cell. The cell temperature was regulated by a controller (J-Kem model 150) that monitored the temperature of the cold finger using a thermocouple and supplied current pulses to the heater at 10 Hz to achieve the set temperature. To ensure that the windows were hotter than the stub, they were insulated from the ambient environment by an envelope of still air contained by the polarizers, which acted like a second set of windows. The cell was operated at 118° C. with a stability of better than 0.1° C. To obtain stable operation of the analyzer, it was necessary to wrap the cell in additional insulation and to enclose it in a plexiglass box to protect it from drafts.

Two ring magnets 70 provided an axial bias field of about 172 Gauss, i.e. the constant component of the magnetic field. The magnets were magnetized normal to their faces and oriented along the optical axis. The magnetic field was uniform to better than 1% over the active volume of the vapor.

Electro-magnets 72 (Helmholtz coils) provided the modulated component of the field of ±15 Gauss. The coils were driven by a 10 kHz bipolar current supply included in the coil driver 23 as shown in FIG. 1. Each coil consisted of about 30 turns with a 3 inch diameter, producing about 8 Gauss/amp. The coil driver uses power operational amplifiers to provide a two amp peak-to-peak current. In addition to the oscillating current, the coil driver provides an adjustable current bias between −2 and +2 amps to fine tune the alignment of the Faraday filter spectrum with the laser frequency.

Laser

Figure 6:
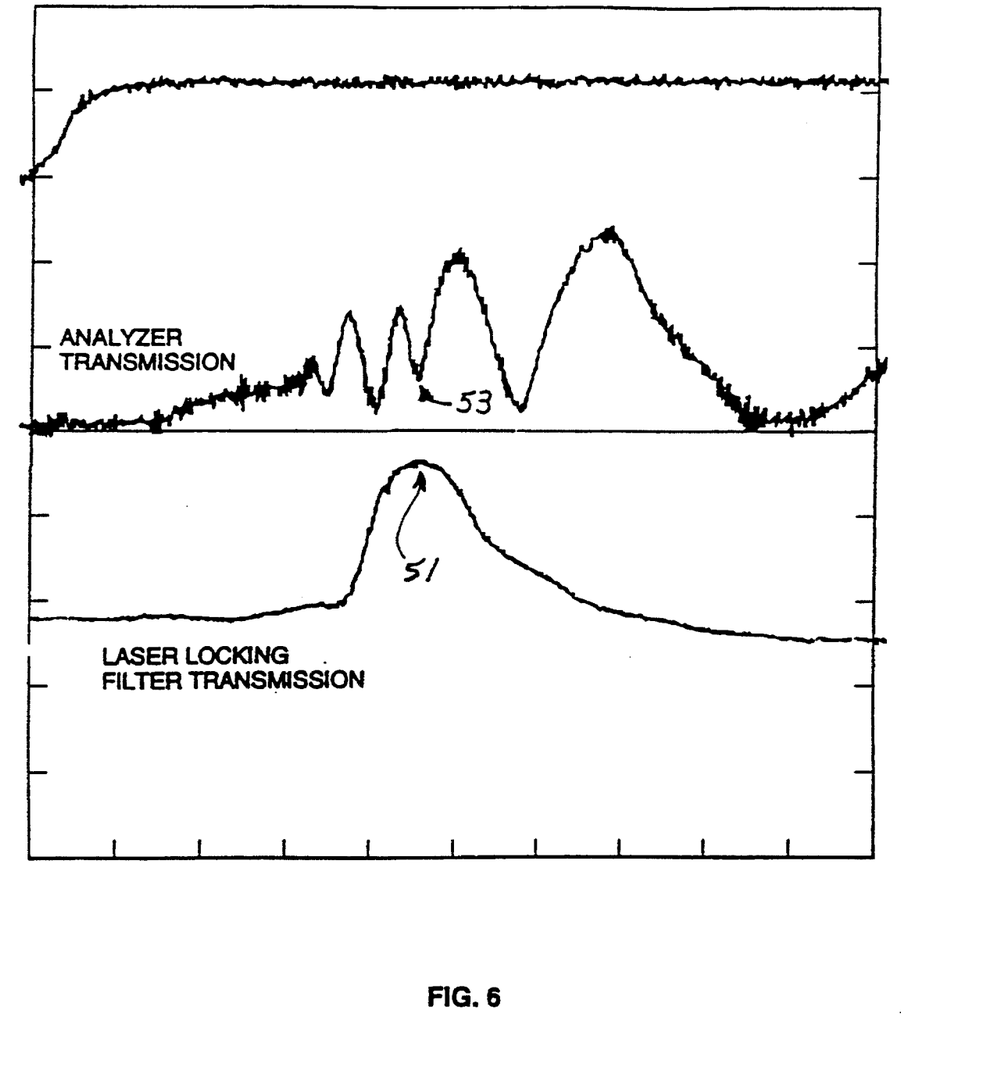
FIG. 6 shows a larger portion of the spectrum of our stop-band filter with only the bias magnetic field applied.

Our velocimeter requires a continuous wave, stable, narrowband laser source matched to the precise frequency of the atomic line filter. This preferred embodiment used a single mode diode laser with optical feedback provided by a Voigt filter. (The Voigt filter is a magneto-optic filter related to the Faraday filter [see J. Menders, P. Searcy, K. Roff and Eric Korevaar, "Blue cesium Faraday and Voigt magneto-optic atomic line filters," Optics Letters 17 (19), 1388 (1992)]. This paper is incorporated by reference.) The scheme starts with a diode laser temperature and current tuned to emit close to the target frequency. Then, the laser gain at the target frequency is enhanced by feeding light at the target frequency back into the laser, causing the laser to emit at the target frequency. We accomplish this by placing a narrowband cesium Voigt filter followed by a 10% reflector immediately after the diode laser. The high resolution spectra in FIG. 6 shows the alignment between the peak 51 of the Voigt filter spectrum and the minimum of the valley 53 at which we operate our Faraday filter.

Our frequency locked laser consists of the diode laser, its collimating optics and mount, the Voigt filter and the feedback mirror integrated into a single vibration resistant structure. The laser diode was a single mode, 50 mW GaAs diode laser (SDL model 5400 G1) specified to lase at 852±5 nm. It was mounted on a heat sink with a thermoelectric heat pump, which was operated by a controller to maintain the diode at the desired set temperature. The laser current was supplied by an ultra-low noise current supply with an rms noise of <1 microamp (ILX model 3620). The optics collimated the beam into a 1 by 3 mm spot.

Faraday and Voigt filters combine the same elements in their construction, but use distinct geometries. Whereas the Faraday filter has a longitudinal magnetic field, the Voigt filter uses a transverse field at 45° to the polarization axes of the crossed polarizers. We use the Voigt filter as a frequency locker because its peaks are slightly sharper and the magnet placement is more convenient. Like the Faraday filter, the center frequency of the Voigt filter can be adjusted to some extent by varying the optical path length through the vapor, the vapor temperature and the field strength. To obtain the frequency alignment shown in FIG. 6, we used a vapor cell with a path length of 1 cm, a vapor temperature of 87.9° C. and a field of 300 Gauss.

Lock-In Amplifiers

The lock-in amplifiers function as bandpass filters which measure the spectral components at $f_m$ and $2f_m$ in the voltage waveform output by the photodetector/preamplifer. The lock-ins achieve this function by amplifying the input signal in synchronism with the reference sync signal. Synchronous amplification means that the lock-in amplifier gain is sinusoidally modulated at the frequency of and in phase with the reference signal. When the output from the synchronous amplifier is passed through a low pass filter, only the spectral component at the reference frequency is passed. The lock-in amplifiers have a phase adjustment that allows the user to compensate for phase leads or lags that may develop in the sync signal.

The SRS 510 was set up to measure the first harmonic signal at $f_m$ by synchronous amplification at the Doppler analyzer modulation frequency supplied by the coil driver sync signal with the appropriate phase setting. The SRS 530 was setup to measure the second harmonic by using the second harmonic detection feature. In this mode, the lock-in generates a frequency at twice the sync signal for synchronous amplification. This lock-in is capable of providing the second harmonic amplitude without adjusting the input phase by reading the direct and in-quadrature components of the signal and calculating the vector magnitude.

Principles of Operation

Figure 2A:
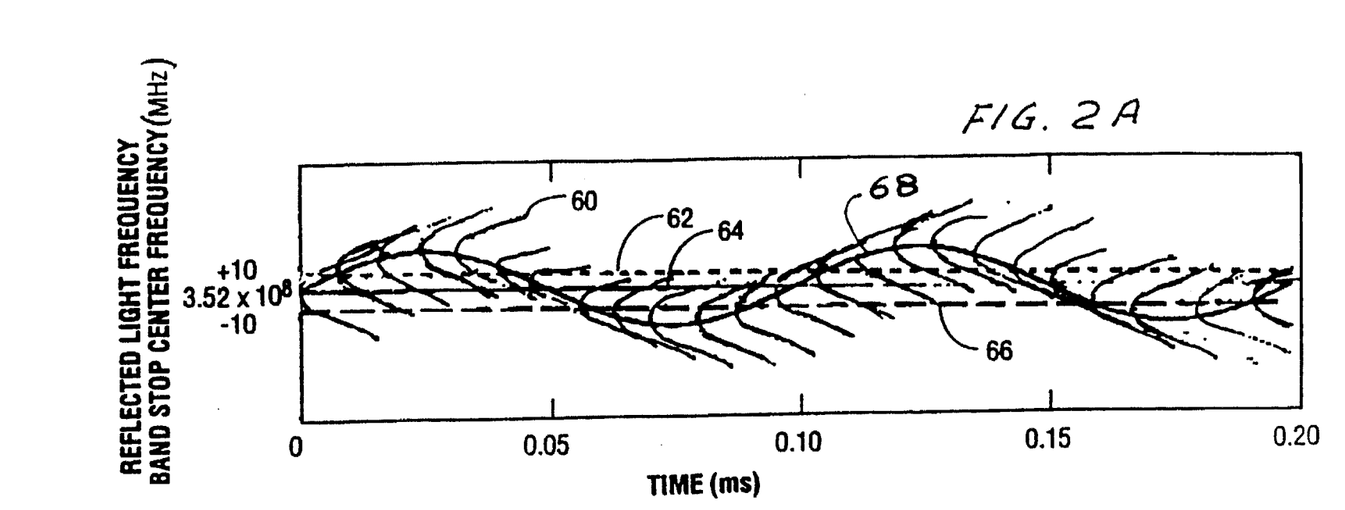
FIGS. 2A and 2B show the functioning of our stop-band filter.
Figure 2B:
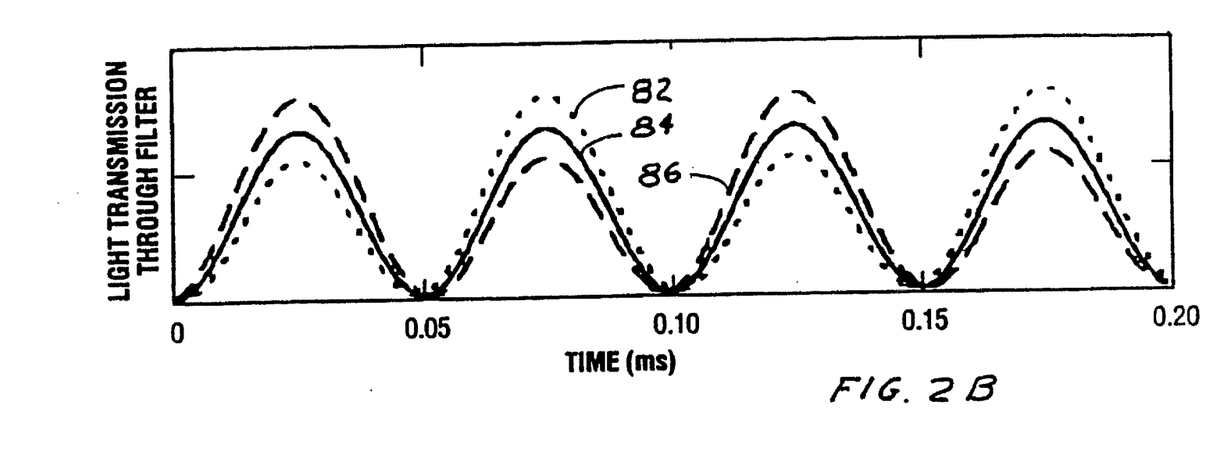

The principle of operation of the velocimeter can be explained as follows. Suppose that the laser frequency is exactly aligned with the center frequency 53 as shown in FIG. 6. We compare the detector waveforms generated for input light of the (unshifted) reference with those corresponding to light Doppler shifted up and down by 10 MHz. FIG. 2A shows a curve 68 representing the frequency of the transmission minimum as a function of time. The frequency of the minimum is observed to sweep above and below the test lines 62,64 and 66 representing input light shifted plus10, 0 and minus10 Mhz with respect to the undithered center frequency 53. (A shift in frequency of 10 Mhz corresponds to a velocity of about 4.3 meters/sec.) As the transmission valley of the analyzer is dithered, the transmission for each of the test frequencies is modulated differently. From the curve 68 and the test frequency lines we can predict that the transmitted power will reach a minimum when the curve intersects each of the test frequency lines. Furthermore, the relative amplitude of the light transmitted through the analyzer increases as the frequency difference between the curve and the test frequencies increases. This is illustrated by the transmission spectra insets attached at intervals along the transmission minimum curve. As the frequency separation between the transmission valley center and a test frequency grows, the test frequency is further away from the transmission minimum, and transmission is greater. The analyzer transmission corresponding to light at test frequencies at +10, 0 and −10 MHz (corresponding to 62, 64 and 66, respectively) are shown in FIG. 2b as curves 82, 84 and 86. The transmission corresponding to zero shifted light 84 at the valley minimum frequency 53 consists of four peaks of equal amplitude occurring at twice the frequency of the dithering $2f_m$. However, the transmission corresponding to light shifted by +10 or −10 Mhz (82 and 86 respectively) exhibits peaks of alternating amplitudes. Notice how this half periodicity results in the development of a spectral component at the dither frequency $f_m$. Also, notice how the transmission waveforms corresponding to the +10 and −10 MHz shifts are 180° out of phase, which is distinguished by the lock-in amplifiers as a change in sign. This allows us to measure positive and negative velocities. A detailed analysis shows that the ratio of the spectral components $S_f/S_{2f}$ is linearly proportional to the frequency shift, and hence, the target velocity.

Other Embodiments

Persons skilled in the art will recognize that there are many ways of practicing this invention in addition the embodiments described above. For example, the Faraday filter could be constructed in many different ways. Other Faraday filters based on other alkali metal vapors or alkaline earth vapors which could be matched to properly tuned lasers could be used. An electro magnet could be used in place of the permanent magnet. Many types of electromagnets other than the Helmholtz coils could be used to provide the oscillating field. Various other polarizers such as prism polarizers which could be used in place of the sheet polarizers used. The modulation frequency could be any frequency from a few hertz to very high frequencies providing the required field strengths could be produced; higher frequencies avoid effects of 1/f noise intrinsic to most electronics. Although in our preferred embodiment we dither around the bottom of a valley in the transmission spectrum, the Faraday filter can also be operated around a peak in the spectrum.

In the preferred embodiment, a reference calibration was obtained by using a shutter to select between the reference and probe beam. Other means of beam selection including electro-optic polarization switching could be used. It is desirable to continuously monitor the reference beam signal instead of switching between beams. For example, with a continuous measure of $X_0$, a servo-loop could be used to adjust the magnetic field bias to remove any relative drift between the laser and the Faraday filter. Schemes for introducing the reference beam for continuous measurement include sharing the filter aperture between both the signal and the reference beam, or directing the beams in opposite directions through the filter.

The probe beam can be transmitted to the target in an optical fiber and the reflection collected in an optical fiber so one expected use of this invention is the measurement of blood speed in vessels and arteries. Equipment can be designed according to this invention to operate at very low light levels. For this reason an expected use is to measure wind speed where light from a low power laser is reflected off particles and aerosols blowing in the wind. Accordingly, the reader should construe the above embodiments of this invention as examples only and the scope of this invention should be determined by the appended claims and their legal equivalents.

We claim:

1. A laser Doppler velocimeter for measuring the velocity of a target, comprising:
   a) a laser producing a laser beam,
   b) a beam splitting means for splitting said laser beam into a probe beam and a reference beam said probe beam being directed at said target,
   c) a collection-forming means for collecting light of said probe beam reflected from said target and forming at least a portion of said reflected light into a reflected beam,
   d) a directing means for directing both said reference beam and said reflected beam into at least one atomic line filter said atomic fine filter comprising:
      1) a vapor cell,
      2) a first magnet means for providing a constant magnetic field at said vapor cell,
      3) a second magnet means for providing an alternating magnetic field at said vapor cell, said alternating magnetic field defining a first frequency,
      4) crossed polarizers,
   e) a detection means for detecting light of said reference beam and said reflected beam passing through said at least one atomic line filter, said reflected light detected by said detection means containing light oscillating at said first frequency and oscillating at a second frequency equal to twice said first frequency and said reference beam containing light modulated at a frequency equal to twice said first frequency, said first and said second frequencies each defining amplitudes,
   f) a frequency measuring means for measuring the relative amplitudes of said first and said second frequencies in the light detected by said detection means, the velocity of said target being determinable from said amplitude measurements.

2. A velocimeter as in claim 1 wherein said laser is a frequency locked diode laser.

3. A velocimeter as in claim 2 wherein said laser is locked with an atomic line filter.

4. A velocimeter as in claim 3 wherein said atomic line filter is a Voigt filter.

5. A velocimeter as in claim 1 wherein said collection-forming means comprises at least one optical fiber.

6. A velocimeter as in claim 1 and further comprising an optical fiber means for directing said probe beam to said target.

7. A velocimeter as in claim 1 wherein said second magnetic means comprise at least one Helmholtz coil.

8. A velocimeter as in claim 1 wherein said first magnet means comprise at least one permanent magnetic.

9. A velocimeter as in claim 1 wherein said detection means comprises a photodiode.

10. A velocimeter as in claim 1 wherein said detection means comprises a photodiode/preamplifier.

11. A velocimeter as in claim 1 wherein said frequency measuring means comprises two lock in amplifiers.

12. A velocimeter as in claim 1 and further comprising a shutter means for alternately passing said reference beam and said reflected beam through said atomic line filter.

* * * * *